(12) United States Patent
Sasaki et al.

(10) Patent No.: US 9,985,530 B2
(45) Date of Patent: May 29, 2018

(54) DC-DC CONVERTER AND CONTROL METHOD THEREOF

(71) Applicant: NISSAN MOTOR CO., LTD., Yokohama-shi, Kanagawa (JP)

(72) Inventors: Kensuke Sasaki, Sagamihara (JP); Daiki Tanaka, Zama (JP); Yuichi Shibukawa, Yokohama (JP); Atsuo Kawamura, Yokohama (JP); Kohei Aoyama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 14/892,768

(22) PCT Filed: Mar. 27, 2014

(86) PCT No.: PCT/JP2014/058973
§ 371 (c)(1),
(2) Date: Nov. 20, 2015

(87) PCT Pub. No.: WO2014/192399
PCT Pub. Date: Dec. 4, 2014

(65) Prior Publication Data
US 2016/0094133 A1 Mar. 31, 2016

(30) Foreign Application Priority Data

May 30, 2013 (JP) ................................. 2013-113811

(51) Int. Cl.
*H02M 1/34* (2007.01)
*H02M 3/335* (2006.01)
*H02M 1/00* (2006.01)

(52) U.S. Cl.
CPC ... *H02M 3/33507* (2013.01); *H02M 3/33584* (2013.01); *H02M 2001/0035* (2013.01);
(Continued)

(58) Field of Classification Search
CPC . H02M 2001/0032; H02M 2001/0035; H02M 2001/0054; H02M 2001/0058;
(Continued)

(56) References Cited

U.S. PATENT DOCUMENTS

| | | | |
|---|---|---|---|
| 2006/0279966 A1* | 12/2006 | Fan | H02M 3/337 363/17 |
| 2007/0152647 A1* | 7/2007 | Liao | H02M 1/32 323/282 |

(Continued)

FOREIGN PATENT DOCUMENTS

| | | |
|---|---|---|
| JP | 2002-233146 A | 8/2002 |
| TW | 200941913 A | 10/2009 |

*Primary Examiner* — Gary L Laxton
(74) *Attorney, Agent, or Firm* — Young Basile Hanlon & MacFarlane, P.C.

(57) ABSTRACT

A soft switching system DC-DC converter includes a switching element, a transformer or a reactor, and a controller configured to control a switching operation of the switching element; and carries out the switching operation of the switching element in a state that a voltage or a current to be applied to the switching element is zero. In a case where a required output value of the DC-DC converter is lower than the minimum output over which soft switching is established, the controller controls the operation of the switching element so that an operation period in which an output of the DC-DC converter becomes the minimum output or higher and a stop period in which the output becomes zero are alternately repeated.

6 Claims, 4 Drawing Sheets

(52) U.S. Cl.
CPC .. *H02M 2001/0058* (2013.01); *Y02B 70/1491* (2013.01); *Y02B 70/16* (2013.01)

(58) Field of Classification Search
CPC ............. H02M 3/335; H02M 3/33569; H02M 3/33576
See application file for complete search history.

(56) References Cited

U.S. PATENT DOCUMENTS

2009/0237045 A1 9/2009 Dishman et al.
2009/0244934 A1 10/2009 Wang et al.

\* cited by examiner

//DC-DC CONVERTER AND CONTROL METHOD THEREOF

CROSS REFERENCE TO RELATED APPLICATION

The present application claims priority to Japanese Patent Application No. 2013-113811 filed on May 30, 2013 all of which is incorporated herein by reference.

TECHNICAL FIELD

The present invention relates to a soft switching system DC-DC converter and a control method thereof.

BACKGROUND

Heretofore, a switching power source apparatus provided with a control circuit is known (see JP2002-233146A). The control circuit causes a voltage to be induced to a secondary winding by switching a switching element provided at a primary side of a transformer between on and off to intermittently apply a voltage to a primary winding, thereby controlling a time when the switching element is turned on in accordance with a state of a load on the secondary side. In this conventional switching power source apparatus, it is disclosed that a period of time when the control circuit is forcibly turned off is provided in a case where a required output value is low, whereby an off state and an on state are repeated to realize electric power saving.

Here, a soft switching system DC-DC converter in which a switching element is turned on or off after a voltage applied to the switching element becomes 0V or a conducting current becomes 0A using a resonance phenomenon is known. The soft switching system DC-DC converter has a characteristic that hard switching is established when a required output value falls below the minimum output value over which soft switching is established. Therefore, a problem occurs that soft switching is not established and a loss thus increases in a case where the technique described in JP2002-233146A is simply applied to the soft switching system DC-DC converter.

SUMMARY

It is an object of the present invention to provide a technique to establish soft switching in a soft switching system DC-DC converter even in a case where a required output value is lower than the minimum output value over which soft switching is established.

A soft switching system DC-DC converter according to one aspect of the present invention includes a switching element, a transformer or reactor, and a control unit configured to control a switching operation of the switching element; and carries out the switching operation of the switching element in a state that a voltage or a current to be applied to the switching element is zero. In a case where a required output value of the DC-DC converter is lower than the minimum output over which soft switching is established, the control unit controls the operation of the switching element so that an operation period in which an output of the DC-DC converter becomes the minimum output or higher and a stop period in which the output of the DC-DC converter becomes zero are alternately repeated.

Hereinafter, embodiments of the present invention will be described in detail with reference to the accompanying drawings.

DESCRIPTION OF THE EMBODIMENTS

—First Embodiment—

Figure 1:
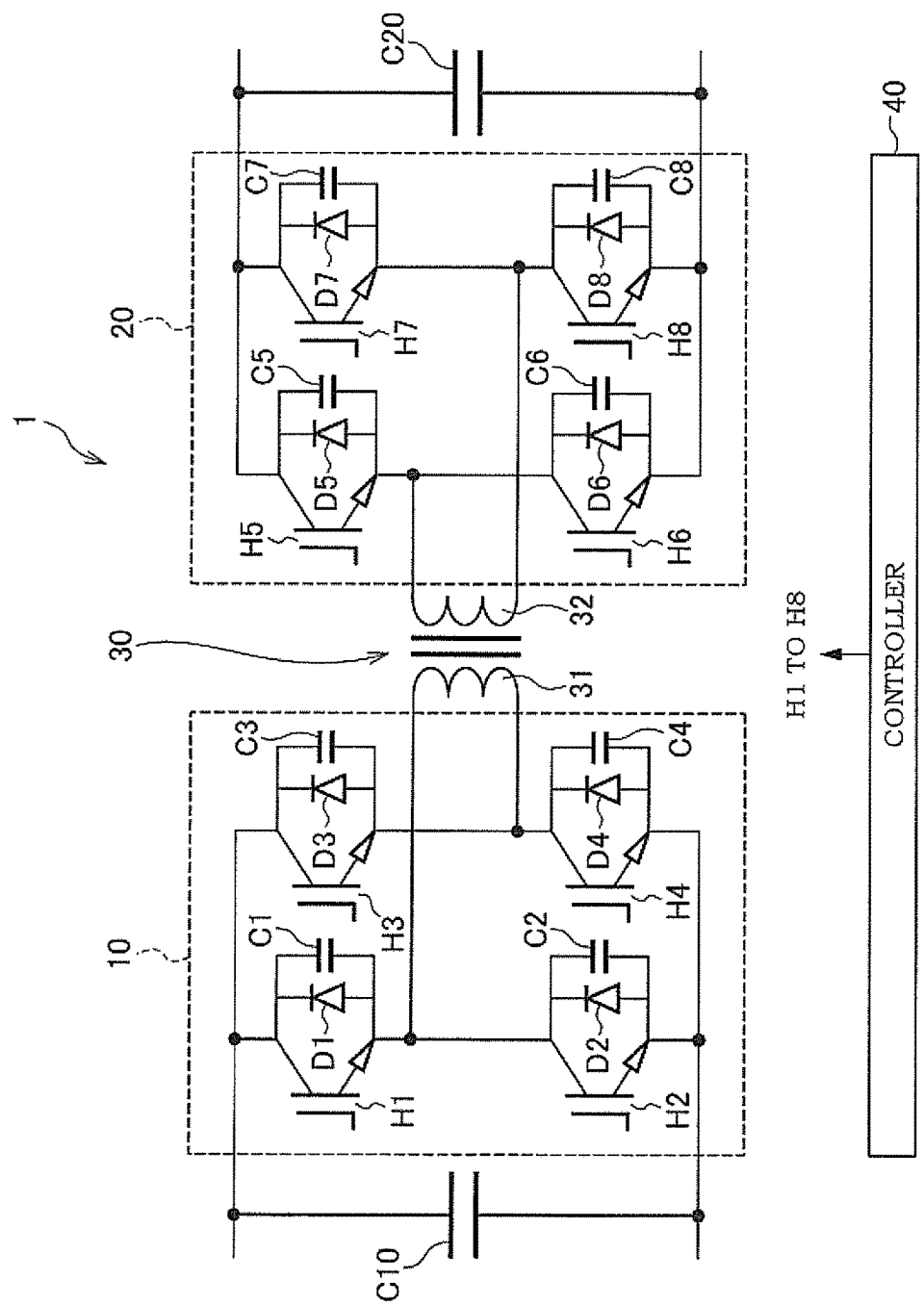
FIG. 1 is a view showing a configuration of a DC-DC converter according to a first embodiment.

FIG. 1 is a view showing a configuration of a soft switching system DC-DC converter (hereinafter, referred to simply as a "DC-DC converter") according to a first embodiment. A DC-DC converter 1 shown in FIG. 1 is a snubber resonance DC-DC converter, and is mounted on and used for an electric vehicle, for example. However, an application destination of the DC-DC converter according to the present embodiment is not limited to the vehicle.

The DC-DC converter 1 according to the first embodiment includes a primary side switching circuit 10, a secondary side switching circuit 20, a transformer 30, a primary side smoothing capacitor C10, a secondary side smoothing capacitor C20, and a controller 40. The primary side switching circuit 10 is connected to a primary winding 31 of the transformer 30, and the secondary side switching circuit 20 is connected to a secondary winding 32 of the transformer 30. The primary winding 31 and the secondary winding 32 of the transformer 30 are magnetically coupled to each other.

The primary side switching circuit 10 includes switching elements H1 to H4, antiparallel diodes D1 to D4, and snubber capacitors C1 to C4. Further, the secondary side switching circuit 20 includes switching elements H5 to H8, antiparallel diodes D5 to D8, and snubber capacitors C5 to C8.

The controller 40 controls on/off of each of the switching elements H1 to H8 in accordance with an output target value of the DC-DC converter.

Since the snubber resonance DC-DC converter 1 shown in FIG. 1 has a known configuration, explanation of a basic operation thereof will be omitted. However, soft switching is realized by charging or discharging the snubber capacitor during a dead time period of a transformer current. An optimal capacity of each of the snubber capacitors C1 to C8, by which charging or discharging is completed during the dead time period, is selected by comparing a resonance frequency with respect to a leakage inductance of the transformer 30 with the dead time. On the other hand, a charging/discharging current of a snubber capacitor is supplied mainly by a load current that flows in the transformer 30. For this reason, the conventional DC-DC converter becomes hard switching in a case where the load current is lower than a value of an extent at which the snubber capacitor can be charged or discharged during the dead time period.

Hereinafter, a characteristic operation of the DC-DC converter according to the first embodiment will be described.

Figure 2:
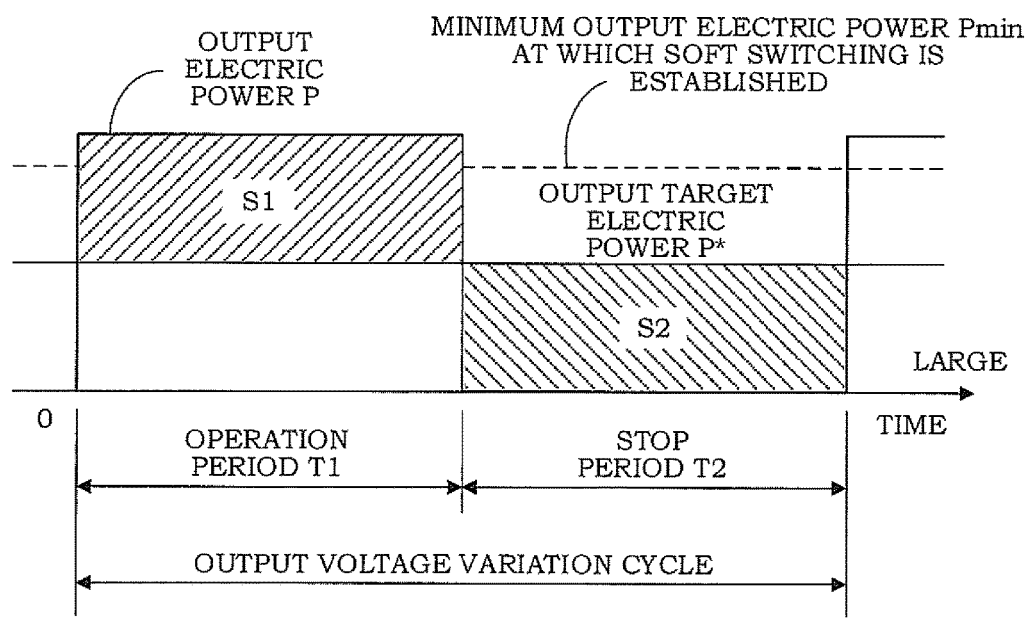
FIG. 2 is a view showing one example of a time change in an output of the DC-DC converter according to the first embodiment.

FIG. 2 is a view showing one example of a time change in an output of the DC-DC converter according to the first embodiment. As described above, in the conventional soft switching system DC-DC converter, hard switching is established when an output electric power P falls below the minimum output electric power Pmin over which soft switching is established. Therefore, in the present embodiment, in a case where an output target electric power P* of the DC-DC converter falls below the Pmin, on/off of each of the switching element H1 to H8 is controlled so that an operation period in which an actual output electric power P becomes the Pmin or higher and a stop period in which the actual output electric power P becomes zero are alternately repeated and an average value of the actual output electric power P becomes the output target electric power P*.

In this regard, FIG. 2 shows only one cycle of an output voltage variation cycle constituted from an operation period T1 and a stop period T2. However, the DC-DC converter is caused to carry out an intermittent operation so that the operation period and the stop period described above are alternately repeated.

In the example shown in FIG. 2, the operations are controlled so that the actual output electric power P becomes the Pmin or higher in the operation period T1, and is controlled so that the actual output electric power P becomes zero in the stop period T2. The actual output electric power P in the operation period and the periods T1, T2 are defined so that a portion in which the actual output electric power P exceeds the output target electric power P* in the operation period T1 is the same as a portion in which the actual output electric power P lacks with respect to the output target electric power P* in the stop period T2, that is, an area of S1 is equal to an area of S2 in FIG. 2. This makes it possible to cause the average value of the actual output electric power P to be coincident with the output target electric power P*.

In this regard, in a case where a variation value of the output voltage of the DC-DC converter is larger than a request from the load, a capacity of the secondary side smoothing capacitor C20 may be increased.

Figure 3:
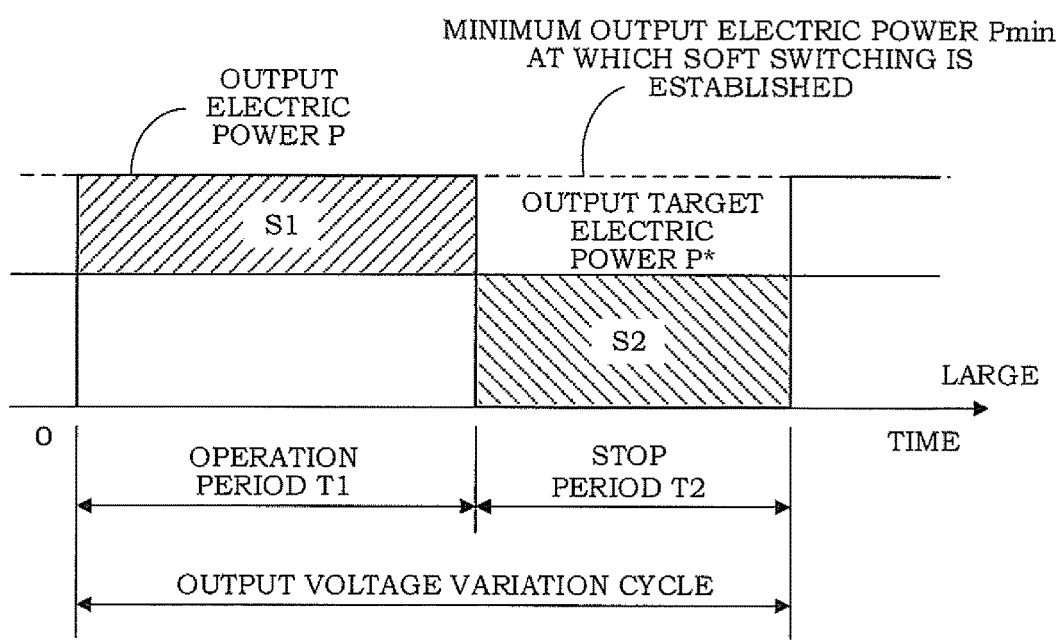
FIG. 3 is a view showing one example of the time change in the output in a case where the output of the DC-DC converter is controlled so as to become the minimum output Pmin over which soft switching is established.

Here, as shown in FIG. 3, by setting the actual output electric power P in the operation period to the minimum output electric power Pmin at which the soft switching is established, it is possible to minimize a conduction loss. This makes it possible to cause the converter to operate in a state that the loss is the least.

As explained above, the DC-DC converter 1 according to the first embodiment includes: the primary side switching circuit 10 connected to the primary winding 31; the secondary side switching circuit 20 connected to the secondary winding 32; the transformer 30 configured to magnetically couple the primary winding 31 to the secondary winding 32; and the controller 40 configured to control the operations of the primary side switching circuit 10 and the secondary side switching circuit 20. In a case where a required output value P* of the DC-DC converter 1 is lower than the minimum output Pmin at which the soft switching is established, the controller 40 controls the operations of the primary side switching circuit 10 and the secondary side switching circuit 20 so that the operation period in which the output P of the DC-DC converter becomes the minimum output Pmin or higher and the stop period in which the output P of the DC-DC converter becomes zero are alternately repeated. Thus, the output P of the DC-DC converter becomes the minimum output Pmin or higher in the operation period. Therefore, it is possible to establish the soft switching even in a case where the required output value P* is lower than the minimum output Pmin over which soft switching is established.

Further, the controller 40 controls the operations of the primary side switching circuit 10 and the secondary side switching circuit 20 so that the average value of the output P of the DC-DC converter 1 becomes the required output value P*. For this reason, it is possible to satisfy the required output value P* while establishing the soft switching. Further, it is possible to cause the DC-DC converter 1 to stably operate even in a load with high sensitivity with respect to the voltage variation cycle.

In particular, by controlling the operations of the primary side switching circuit 10 and the secondary side switching circuit 20 so that the output P of the DC-DC converter in the operation period becomes the minimum output Pmin at which the soft switching is established, it is possible to minimize the conduction loss in a condition that the soft switching is established, and this makes it possible to cause the converter to operate in the state that the loss is the least.

—Second Embodiment—

A configuration of a DC-DC converter according to a second embodiment is the same as the configuration of the DC-DC converter 1 shown in FIG. 1 according to the first embodiment. Even in the DC-DC converter according to the second embodiment, in a case where an output target electric power P* falls below the minimum output electric power Pmin over which soft switching is established, an operation is controlled so that an operation period in which an actual output electric power P is the Pmin or higher and a stop period in which the actual output electric power P becomes zero are alternately repeated, and so that an average value of the actual output electric power P becomes the output target electric power P*. In the second embodiment, in particular, a control in consideration of a voltage variation range allowed by a load, which is a supply destination of the output electric power by the DC-DC converter, is carried out.

Figure 4:
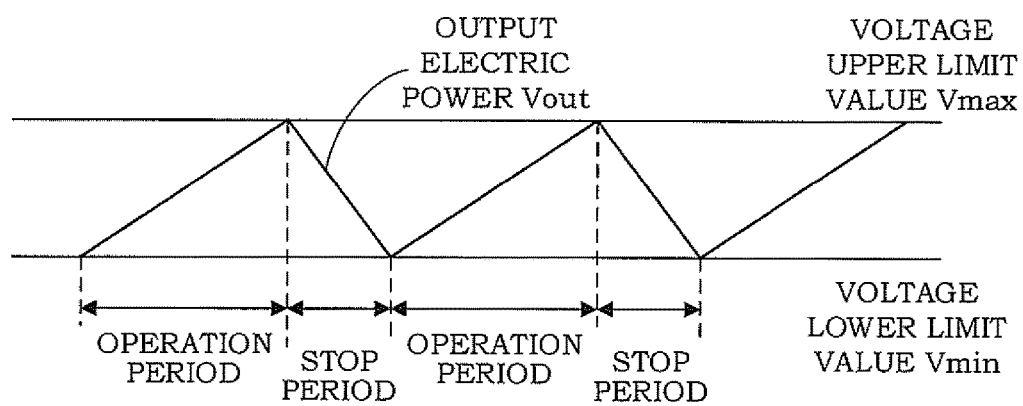
FIG. 4 is a view showing one example of a time change in an output voltage of a DC-DC converter according to a second embodiment.

FIG. 4 is a view showing one example of a time change in an output voltage of the DC-DC converter according to the second embodiment. In FIG. 4, a voltage upper limit value Vmax is a voltage upper limit value allowed by the load, and a voltage lower limit value Vmin is a voltage lower limit value allowed by the load. As shown in FIG. 4, when an output voltage Vout reaches the voltage upper limit value Vmax during an operation of the DC-DC converter (in the operation period), the operation of the DC-DC converter is caused to stop. This causes the output voltage Vout to be lowered. However, when the output voltage Vout reaches the voltage lower limit value Vmin, the DC-DC converter is caused to operate again. Then, when the output voltage Vout reaches the voltage upper limit value Vmax, the operation is caused to stop. Hereinafter, the same operation is repeated.

As shown in FIG. 4, a period of time from a time when the output voltage Vout of the DC-DC converter is the voltage lower limit value Vmin to a time when the output voltage Vout reaches the voltage upper limit value Vmax becomes the operation period, and a period of time from a time when the output voltage Vout is the voltage upper limit value Vmax to a time when the output voltage Vout reaches the voltage lower limit value Vmin becomes the stop period.

By controlling the output voltage of the DC-DC converter so as to become the voltage lower limit value Vmin allowed by the load or more and to become the voltage upper limit value Vmax or lower in this manner, it is possible to control the DC-DC converter within the voltage variation range allowed by the load. Further, by controlling the output voltage so as to become the voltage upper limit value Vmax or lower, it is possible to cause the capacity of a smoothing capacitor (the secondary side smoothing capacitor C20) at an output side of the DC-DC converter to be smaller compared with a case where the output voltage becomes larger than the voltage upper limit value Vmax. This makes it possible to reduce a cost.

In particular, in the DC-DC converter according to the second embodiment, by setting the actual output electric power P in the operation period to the minimum output electric power Pmin at which the soft switching is established as shown in FIG. 3, it is possible to cause the DC-DC converter to operate in the state that the loss is the least.

As explained above, according to the DC-DC converter of the second embodiment, operations of a primary side switching circuit 10 and a secondary side switching circuit 20 are controlled so that a period of time from the time when the output voltage of the DC-DC converter is a predetermined voltage lower limit value to the time when the output voltage of the DC-DC converter reaches a predetermined voltage upper limit value becomes the operation period and a period of time from the time when the output voltage of the DC-DC converter is the predetermined voltage upper limit value to the time when the output voltage of the DC-DC converter is lowered to the predetermined voltage lower limit value becomes the stop period. This makes it possible to cause the DC-DC converter to stably operate even in a load with high sensitivity with respect to a voltage variation width. Further, since the operations are controlled so that the output voltage of the DC-DC converter becomes the predetermined voltage upper limit value or lower, it is possible to cause the capacity of the smoothing capacitor at the output side of the DC-DC converter to be smaller. This makes it possible to reduce the cost.

Further, the predetermined voltage upper limit value is set to the voltage upper limit value allowed by the load that is the supply destination of the output electric power by the DC-DC converter, and the predetermined voltage lower limit value is set to the voltage lower limit value allowed by the load that is the supply destination of the output electric power by the DC-DC converter. For that reason, an appropriate control according to the voltage variation width allowed by the load can be carried out.

The present invention is not limited to the embodiments described above. For example, in the embodiments described above, the snubber resonance DC-DC converter provided with the snubber capacitor has been explained as an example. However, the present invention can be applied to a soft switching system DC-DC converter even though this DC-DC converter does not include a snubber capacitor. Further, in the embodiments described above, the configuration in which the switching circuit is provided not only at the primary side but also at the secondary side has been explained. However, the present invention can also be applied to a DC-DC converter in which no switching circuit is provided at the secondary side. However, in this case, a circuit for converting AC into DC is required at the secondary side.

Further, the present invention can be applied to a DC-DC converter in which a reactor is provided in place of the transformer 30.

The invention claimed is:
1. A snubber resonance soft switching system DC-DC converter, comprising:
  a switching element;
  a transformer or a reactor;
  a snubber capacitor; and
  a control unit configured to control a switching operation of the switching element,
  wherein the control unit carries out the switching operation of the switching element in a state that no voltage or no current is applied to the switching element, and
  wherein, in a case where a required output value of the DC-DC converter is lower than a value below which the snubber capacitor can be charged or discharged during a dead time period, the control unit controls the switching operation of the switching element so that an operation period in which an output of the DC-DC converter becomes a minimum output or higher and a stop period in which the output of the DC-DC converter becomes zero are alternately repeated.

2. The DC-DC converter according to claim 1, wherein the control unit controls the switching operation of the switching element so that an average value of the output of the DC-DC converter becomes the required output value.

3. The DC-DC converter according to claim 1, wherein the control unit controls the switching operation of the switching element so that a period of operation time from a start time when an output voltage of the DC-DC converter is a predetermined voltage lower limit value to a reach time when the output voltage of the DC-DC converter reaches a predetermined voltage upper limit value becomes the operation period, and so that a period of stop time from a higher time when the output voltage of the DC-DC converter is the predetermined voltage upper limit value to a lower time when the output voltage of the DC-DC converter is lowered to the predetermined voltage lower limit value becomes the stop period.

4. The DC-DC converter according to claim 3, wherein the predetermined voltage upper limit value is a voltage upper limit value allowed by a load that is a supply destination of an output electric power by the DC-DC converter, and the predetermined voltage lower limit value is a voltage lower limit value allowed by the load that is the supply destination of the output electric power by the DC-DC converter.

5. The DC-DC converter according to claim 1, wherein the control unit controls the switching operation of the switching element so that the output of the DC-DC converter in the operation period becomes the minimum output.

6. A control method for a snubber resonance soft switching system DC-DC converter,
the DC-DC converter comprising:
  a switching element;
  a snubber capacitor; and
  a transformer or a reactor,
wherein the DC-DC converter carries out a switching operation of the switching element in a state that no voltage or no current is applied to the switching element, the control method comprising:
  determining whether a required output value of the DC-DC converter is lower than a minimum output, soft switching being established over the minimum output; and
  in a case where it is determined that the required output value of the DC-DC converter is lower than a value below which the snubber capacitor can be charged or discharged during a dead time period, controlling an operation of the switching element so that an operation period in which an output of the DC-DC converter becomes the minimum output or higher and a stop period in which the output of the DC-DC converter becomes zero are alternately repeated.

* * * * *